E. E. Hardy,
Harness-Saddle Tree,
Nº 45,492. Patented Dec. 20, 1864.
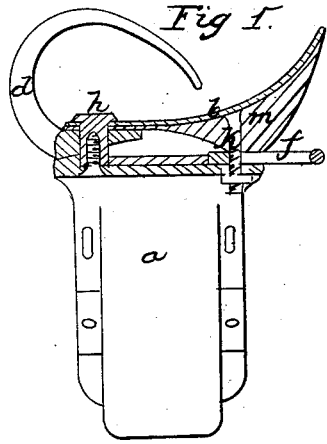
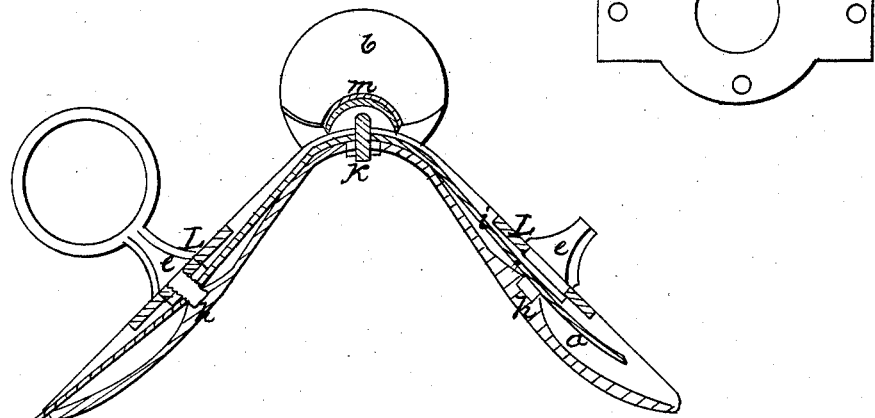
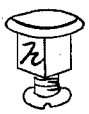
Witnesses;
S. J. Gordon
Geo. H. Collins
Inventor;
Emery E. Hardy

UNITED STATES PATENT OFFICE.

EMERY E. HARDY, OF NEW YORK, N. Y.

IMPROVEMENT IN SADDLE-TREES.

Specification forming part of Letters Patent No. 45,492, dated December 20, 1864.

*To all whom it may concern:*

Be it known that I, EMERY E. HARDY, of the city, county, and State of New York, have invented a new and Improved Saddle-Tree; and I hereby declare that the following is a full, clear, and exact description thereof, reference being had to the accompanying drawings, making a part of this specification, and the letters of reference marked thereon, in which the same letter represents the same thing in each figure.

Figure 1 is a horizontal cut section of my improved saddle-tree; Fig. 2, a longitudinal cut section thereof. Fig. 3 represents the improved socket-bolt by which the seat and hook are secured to the body of the tree.

$a$ represents the body of the tree; $b$, the seat; $c\ c$, the terrets; $d$, the hook; $f$, the adjustable crupper-loop; $h$, the improved socket-bolt; $i$, the back band; $k$, the seat and crupper-loop bolt that secures the seat behind to the body of the tree; L, the terret-plate to secure the nut that holds the terret; $m$, the wooden pad to the seat; $n$, the socket to receive the end of the terret-screw.

One of my improvements consists in getting rid of the projections of bolts, nuts, hook, and ends of terrets, which have proved so objectionable by reason of chafing the back of the animal, and that without leaving the back-band unsecured, as has been the case with all who have sought to obtain that object heretofore. My arrangement permits the back-band to run over the tree or not.

My method of securing the adjustable crupper-loop possesses advantages of simplicity and ready replacement in case of accident not found in more complicated contrivances.

Another improvement is in the manner of attaching the seat to the body so as to make it secure and leave the surface of the seat smooth and even, by having the bolt a part of the seat and drawing it down by a nut beneath the tree.

A third improvement will be found in the construction of the socket-bolt so as to obviate the use of a nut, cutting a screw-thread within the bolt so that the body of the tree can be screwed up to the seat.

A fourth improvement is in providing a socket to receive the end of the terret without permitting it to go through the tree but securing the back-band in place; further, lining the inside of the seat with wood or leather so that the covering of the seat or a welt may be tacked to it and all the advantages of a metal tree and seat retained; again, in so shaping the lower metal ends of the seat by curving them inward as to hold the wooden back in its place, without the use of nuts or screws, leaving the seat smooth; lastly, in the use of the terret-plate to which the nut holds the terret, so that any terret may be used with any tree and not a particular terret made to go with it, as has been done by those who have tried to get rid of projecting terrets heretofore.

Inspection of socket-bolt $h$, crupper-loop bolt $k$, sockets $n\ n$, and back-band $i$ in the drawings will sufficiently show the applications by which these ends are attained without further description.

What I claim, and desire to secure by Letters Patent, is—

1. The terret-plate of a saddle-tree constructed and arranged as described.

2. In combination with the terret-plate and saddle-tree, the socket $n$, the crupper-loop $f$, and pin $k$, attached to the seat, as described and set forth.

3. Lining a metal saddle-seat with wood or leather so that the covering of the seat or a welt may be tacked to it.

EMERY E. HARDY.

Witnesses:
S. J. GORDON,
GEO. H. COLLINS.